(12) United States Patent
Mather et al.

(10) Patent No.: US 11,519,078 B2
(45) Date of Patent: Dec. 6, 2022

(54) ZINC RIBBON ANODES AND ASSOCIATED METHODS

(71) Applicant: Artazn LLC, Greer, SC (US)

(72) Inventors: Michael Thomas Mather, Greeneville, TN (US); Vinay Ramankutty Menon, Johnson City, TN (US)

(73) Assignee: ARTAZN LLC, Greer, SC (US)

( * ) Notice: Subject to any disclaimer, the term of this patent is extended or adjusted under 35 U.S.C. 154(b) by 751 days.

(21) Appl. No.: 16/504,001

(22) Filed: Jul. 5, 2019

(65) Prior Publication Data

US 2020/0010960 A1 Jan. 9, 2020

Related U.S. Application Data

(60) Provisional application No. 62/694,218, filed on Jul. 5, 2018.

(51) Int. Cl.
*C23F 13/16* (2006.01)
*F16L 57/00* (2006.01)

(52) U.S. Cl.
CPC .............. *C23F 13/16* (2013.01); *F16L 57/00* (2013.01); *C23F 2213/32* (2013.01)

(58) Field of Classification Search
CPC ... C23F 13/00–13/22; C23F 2213/00–2213/30
See application file for complete search history.

(56) References Cited

U.S. PATENT DOCUMENTS 3,152,059 A * 10/1964 Wellington ............. C23F 13/10
428/650

OTHER PUBLICATIONS

"Plattline Zinc Ribbon Anodes," The Platt Brothers & Company, Applicant admitted prior art (4 pages).

* cited by examiner

*Primary Examiner* — Alexander W Keeling
(74) *Attorney, Agent, or Firm* — Eversheds Sutherland (US) LLP

(57) ABSTRACT

Zinc ribbon anodes and methods of making the same are provided herein. In some embodiments, the zinc ribbon anode includes a hollow elongated zinc ribbon having a first end, a second end opposite the first end, an outer surface, and an inner surface defining a hollow space extending from the first end to the second end; and an elongated metal core disposed within the hollow space and in contact with the inner surface, wherein a cross-section of the hollow elongated zinc ribbon taken between the first end and the second end and perpendicular to the outer surface is polygonal in shape, and wherein the cross-section has an aspect ratio of at least 1.5:1.

17 Claims, 2 Drawing Sheets

ZINC RIBBON ANODES AND ASSOCIATED METHODS

CROSS-REFERENCE TO RELATED APPLICATIONS

This application claims the benefit of U.S. Provisional Application No. 62/694,218, filed Jul. 5, 2018, which is hereby incorporated herein in its entirety.

FIELD OF THE DISCLOSURE

This disclosure generally relates to metal anodes, and associated methods, and more specifically to zinc ribbon anodes, and methods of making the same.

BACKGROUND

Zinc ribbon anodes are widely used to ground or provide AC mitigation for industrial structures and utilities such as pipelines, storage tanks, and the like. However, commercially available zinc ribbon anodes, such as Platt® products available from The Platt Brothers and Company, and those available from offshore suppliers, have a propensity to crack during placement and handling. This propensity to crack is particularly pronounced in low temperature conditions, which can limit the times of year when zinc ribbon anodes can be installed.

Accordingly, there is a need for zinc ribbon anodes with improved flexibility and bendability.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

In one aspect, a zinc ribbon anode is provided including: a hollow elongated zinc ribbon having a first end, a second end opposite the first end, an outer surface, and an inner surface defining a hollow space extending from the first end to the second end; and an elongated metal core disposed within the hollow space and in contact with the inner surface, wherein a cross-section of the hollow elongated zinc ribbon taken between the first end and the second end and perpendicular to the outer surface is polygonal in shape, and wherein the cross-section has an aspect ratio of at least 1.5:1.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

DETAILED DESCRIPTION

Figure 1:
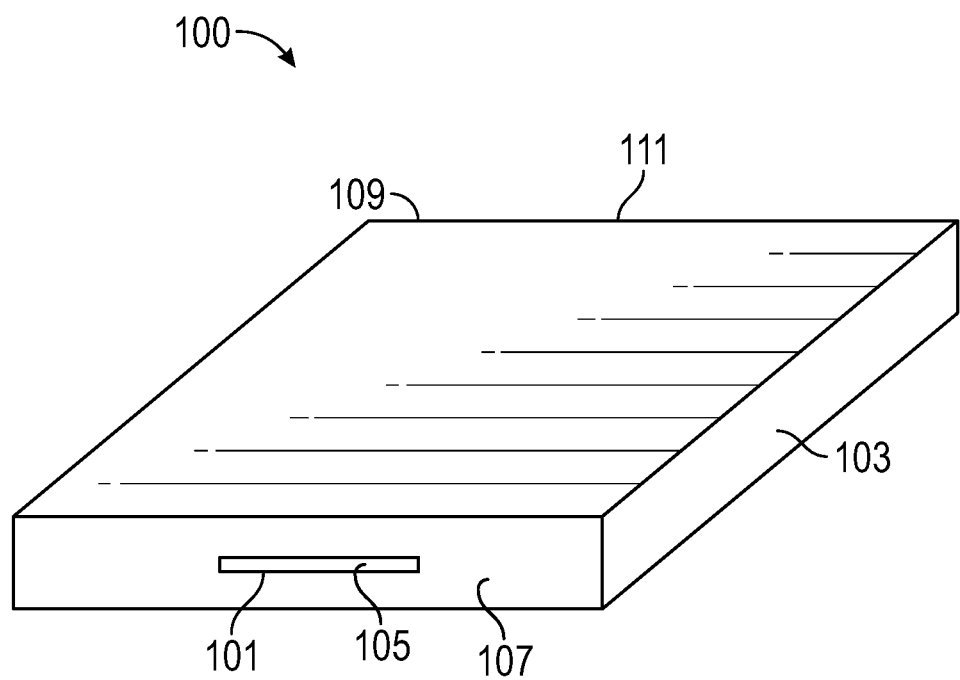
FIG. 1 illustrates a zinc ribbon anode according to an embodiment of the present disclosure.

Zinc ribbon anodes, and methods of making the same are provided herein.

As used herein, the term "aspect ratio" is used broadly to refer to the ratio between the length of the longest dimension of a cross-section of a zinc ribbon anode taken perpendicular to the outer surface and the length of the dimension of the cross section perpendicular to the longest dimension.

As used herein, "longitudinal" bending refers to bending about a radius perpendicular to the outer surface of the zinc ribbon anode. In particular, when the outer surface of the zinc ribbon anode is substantially polygonal, longitudinal bending refers to bending about a radius perpendicular to the longest of the polygonal surfaces.

Zinc Ribbon Anodes

Zinc ribbon anodes are disclosed herein. In some embodiments, the zinc ribbon anode includes a hollow elongated zinc ribbon having a first end, a second end opposite the first end, an outer surface, and an inner surface defining a hollow space extending from the first end to the second end. In some embodiments, the zinc ribbon anode further includes an elongated metal core disposed within the hollow space and in contact with the inner surface. In some embodiments, a cross-section of the hollow elongated zinc ribbon taken between the first end and the second end and perpendicular to the outer surface is polygonal in shape. For example, in some embodiments, a cross-section of the hollow elongated zinc ribbon taken between the first end and the second end and perpendicular to the outer surface is substantially rectangular in shape.

In some embodiments, a cross-section of the hollow elongated zinc ribbon taken between the first end and the second end and perpendicular to the outer surface has an aspect ratio of at least 1.5:1, for example at least 2:1, at least 5:1, or at least 15:1. For example, in some embodiments the cross-section has an aspect ratio of about 1.5:1, about 2:1, about 3:1, about 4:1, about 5:1, about 10:1, about 15:1, about 16:1, about 17:1, about 18:1, about 19:1, about 20:1, or any ranges therebetween.

In some embodiments, the outer surface of the zinc ribbon anode has an area of at least about 35 square inches per pound of zinc ribbon anode, at least about 52 square inches per pound of zinc ribbon anode, or at least about 70 square inches per pound of zinc ribbon anode. For example, in some embodiments the outer surface has an area of about 35 square inches per pound of zinc ribbon anode, about 40 square inches per pound of zinc ribbon anode, about 45 square inches per pound of zinc ribbon anode, about 50 square inches per pound of zinc ribbon anode, about 55 square inches per pound of zinc ribbon anode, about 60 square inches per pound of zinc ribbon anode, about 65 square inches per pound of zinc ribbon anode, about 70 square inches per pound of zinc ribbon anode, about 75 square inches per pound of zinc ribbon anode, about 80 square inches per pound of zinc ribbon anode, about 85 square inches per pound of zinc ribbon anode, about 90 square inches per pound of zinc ribbon anode, about 95 square inches per pound of zinc ribbon anode, about 100 square inches per pound of zinc ribbon anode, about 110 square inches per pound of zinc ribbon anode, about 115 square inches per pound of zinc ribbon anode, about 120 square inches per pound of zinc ribbon anode, about 125 square inches per pound of zinc ribbon anode, about 130 square inches per pound of zinc ribbon anode, or any ranges therebetween.

In some embodiments, the outer surface of the zinc ribbon anode has a surface area of at least 30 square inches per linear foot of zinc ribbon anode, at least 39 square inches per linear foot of zinc ribbon anode, or at least about 60 square inches per linear foot of zinc ribbon anode. For example, in some embodiments the outer surface has a surface area of about 30 square inches per linear foot of zinc ribbon anode, about 35 square inches per linear foot of zinc ribbon anode, about 40 square inches per linear foot of zinc ribbon anode, about 45 square inches per linear foot of zinc ribbon anode, about 50 square inches per linear foot of zinc ribbon anode, about 55 square inches per linear foot of zinc ribbon anode, about 60 square inches per linear foot of zinc ribbon anode, about 65 square inches per linear foot of zinc ribbon anode, about 70 square inches per linear foot of zinc ribbon anode, about 75 square inches per linear foot of zinc ribbon anode, about 80 square inches per linear foot of zinc ribbon anode, about 85 square inches per linear foot of zinc ribbon anode, about 90 square inches per linear foot of zinc ribbon anode, about 95 square inches per linear foot of zinc ribbon anode, about 100 square inches per linear foot of zinc ribbon anode, about 105 square inches per linear foot of zinc ribbon anode, or any ranges therebetween.

In some embodiments, a cross-section of the elongated metal core taken between the first end and the second end is polygonal in shape. For example, in some embodiments, the cross-section of the elongated metal core is substantially rectangular in shape.

In some embodiments, the grain structure of the hollow elongated zinc ribbon is substantially longitudinal. That is, in some embodiments a majority of the grains or crystals of zinc within the hollow elongated zinc ribbon extend longitudinally between the first and second ends of the hollow elongated zinc ribbon. Without intending to be bound by any particular theory, it is believed that a longitudinal grain structure allows the zinc ribbon anode to be longitudinally bent over a smaller radius than comparative zinc ribbon anodes without a longitudinal grain structure without fracturing.

In some embodiments, the zinc ribbon anode can be longitudinally bent over a smaller radius than a comparative zinc ribbon anode having an aspect ratio of from about 1 to about 2. As used herein, a "comparative" zinc ribbon anode refers to a zinc ribbon anode of an equal weight per foot, and an equal weight of zinc and metal core per foot, but having an aspect ratio of from about 1 to about 2. In some embodiments the zinc ribbon anode can be longitudinally bent over a radius which is at least 20% smaller than the radius over which a comparative zinc ribbon anode having an aspect ratio of from about 1 to about 2. For example, in some embodiments the zinc ribbon anode can be longitudinally bent over a radius which is at least 20% smaller, at least 30% smaller, at least 40% smaller, at least 50% smaller, at least 60% smaller, at least 70% smaller, at least 80% smaller, at least 90% smaller, or at least 100% smaller than the radius over which a comparative zinc ribbon anode having an aspect ratio of from about 1 to about 2.

ILLUSTRATED EMBODIMENTS

FIG. 1 illustrates a zinc ribbon anode according to an embodiment of the present disclosure. The zinc ribbon anode 100 includes a steel core 101, and a hollow elongated zinc ribbon 103, each having first ends 105, 107 and second ends 109, 111. As can be seen in FIG. 1, in this embodiment, the cross-section of each of the steel core 101 and the outer surface of the hollow elongated zinc ribbon 103 are substantially rectangular.

Figure 2:
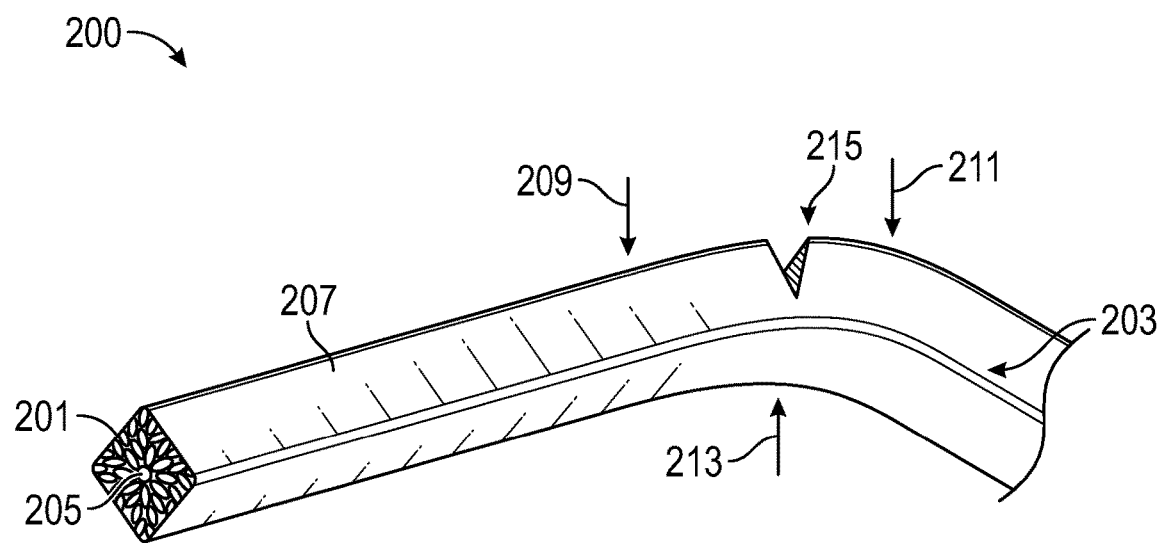
FIG. 2 is a schematic illustration of a conventional cast zinc ribbon anode subjected to a longitudinal bend test.

FIG. 2 is a schematic illustration of a conventional cast zinc ribbon anode 300 subjected to a longitudinal bend test. This zinc ribbon anode 200 has a first end 201, a second end 203, and a metal core 205 surrounded by a cast hollow zinc ribbon 207. Without intending to be bound by any particular theory, it is believed that, by casting the zinc around the metal core 205 to produce the zinc ribbon anode 200, the hollow zinc ribbon 207 develops an axial or equiaxed grain structure, with grains extending axially from the metal core 205, as illustrated on the first end 201.

Without intending to be bound by any particular theory, it is believed that this axial grain structure renders the zinc ribbon anode 200 more prone to develop fractures in an axial direction when being bent longitudinally, as shown in FIG. 2. Specifically, FIG. 2 illustrates a bend test, wherein force is applied as shown in locations 209, 211, and 213. As illustrated, the application of this force, which bends the zinc ribbon anode longitudinally, may result in a fracture 215 in the axial direction, along the axial or equiaxed grain boundaries.

Figure 3:
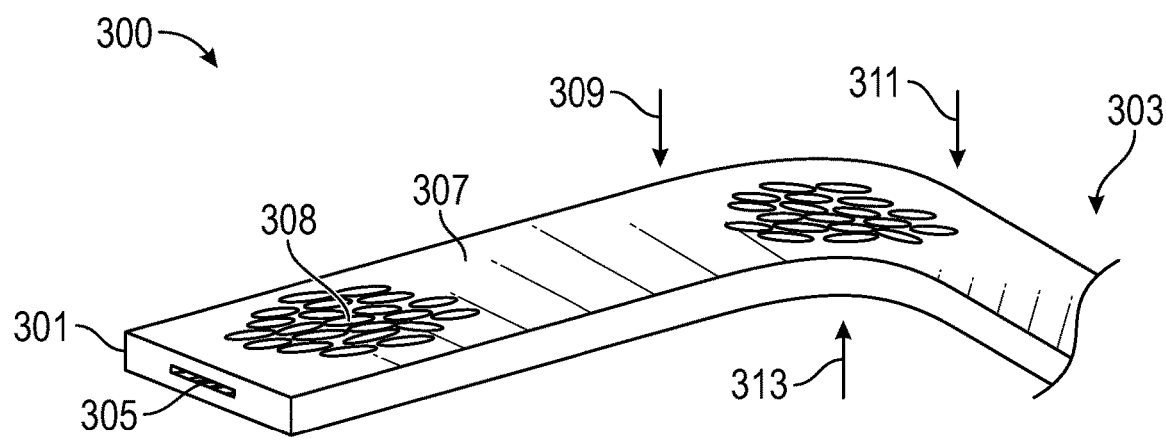
FIG. 3 illustrates a zinc ribbon anode according to an embodiment of the present disclosure subjected to a longitudinal bend test.

FIG. 3 illustrates a zinc ribbon anode 300 according to an embodiment of the present disclosure subjected to a longitudinal bend test. This zinc ribbon anode 300 has a first end 301, a second end 303, and a metal core 305 surrounded by a hollow zinc ribbon 307. The hollow zinc ribbon 307 may be either roll bonded around the metal core 305 or cast around the metal core 305, before later being subjected to a rolling process. Without intending to be bound by any particular theory, it is believed that, by roll bonding or casting and then rolling the zinc around the metal core 305 to produce the zinc ribbon anode 300, the hollow zinc ribbon 307 develops a longitudinal grain structure, with grains extending longitudinally from the first end 301 to the second end 303, as illustrated on the outer surface 308 of the hollow zinc ribbon 307.

Without intending to be bound by any particular theory, it is believed that this longitudinal grain structure renders the zinc ribbon anode 300 more flexible and less prone to develop fractures in an axial direction when being bent longitudinally, as shown in FIG. 3. Specifically, FIG. 3 illustrates a bend test, wherein force is applied as shown in locations 309, 311, and 313. As illustrated, the application of this force, which bends the zinc ribbon anode longitudinally, does not result in an axial fracture, even when bent around the same radius as a comparative zinc ribbon anode with an axial grain structure, such as that illustrated in FIG. 2.

EXAMPLES

Embodiments of the present disclosure may be better understood by reference to the following examples.

Example 1: Zinc Ribbon Anode Designs

Zinc ribbon anodes according to the present disclosure may be made with the dimensions disclosed in Table 1 below, and having a cross-section which is substantially rectangular in shape, using any of the processes disclosed herein

TABLE 1

Zinc Ribbon Anodes of the Present Disclosure

|  | Product A | Product B | Product C | Product D |
| --- | --- | --- | --- | --- |
| Cross-sectional length (inches) | 0.206 | 0.154 | 0.11 | 0.065 |
| Cross-sectional width (inches) | 3.75 | 2.5 | 1.75 | 1.25 |
| Surface area per foot of zinc ribbon anode (in$^2$/ft) | 94.9 | 63.7 | 44.6 | 31.6 |
| Volume per foot of zinc ribbon anode (in$^3$/ft) | 9.27 | 4.62 | 2.31 | 0.975 |
| Weight per foot of zinc ribbon anode (lb/ft) | 2.4 | 1.2 | 0.6 | 0.25 |
| Aspect ratio of length:width | 18.2 | 16.23 | 15.91 | 19.23 |
| Surface area per pound of zinc ribbon anode (in$^2$/lb) | 39.54 | 53.23 | 74.61 | 124.98 |

Advantageously, the zinc ribbon anodes disclosed in Table 1 above exhibit substantially larger surface area per foot than comparable products available from The Platt Brothers and Company, even though these products have the same weight per foot. As a comparison, the physical dimensions of the Super, Plus, Standard, and Small zinc ribbon anodes available from The Platt Brothers and Company are included in Table 2 below:

TABLE 2

Commercially-Available Zinc Ribbon Anodes

|  | Super | Plus | Standard | Small |
| --- | --- | --- | --- | --- |
| Cross-sectional width (inches) | 1 | 0.625 | 0.5 | 0.34375 |
| Cross-sectional length (inches) | 1.25 | 0.875 | 0.5625 | 0.40625 |
| Surface area per foot of zinc ribbon anode (in$^2$/ft) | 38.42 | 25.81 | 18.06 | 12.77 |
| Volume per foot of zinc ribbon anode (in$^3$/ft) | 9.27 | 4.63 | 2.32 | 0.965 |
| Weight per foot of zinc ribbon anode (lb/ft) | 2.4 | 1.2 | 0.6 | 0.25 |
| Aspect ratio of length:width | 1.25 | 1.40 | 1.13 | 1.18 |
| Surface area per pound of zinc ribbon anode (in$^2$/lb) | 16.01 | 21.51 | 30.10 | 51.09 |

As can be seen from comparing Table 1 and Table 2, the zinc ribbon anode products A, B, C, and D have the same weight per foot of zinc ribbon anode as the commercially-available Super, Plus, Standard, and Small zinc ribbon anodes, respectively. However, the surface area per foot of zinc ribbon anode and the surface area per pound of zinc ribbon anode is substantially higher for the zinc ribbon anode products A, B, C, and D than for the commercially-available Super, Plus, Standard, and Small zinc ribbon anodes.

Without intending to be bound by any particular theory, it is believed that the zinc ribbon anodes of Table 1, which offer substantially greater surface area per length of zinc ribbon anode and substantially greater surface area per weight of zinc ribbon and substantially greater surface area per pound of zinc ribbon anode, will be much more effective as grounding or AC mitigation wires. In other words, it is believed that the zinc ribbon anodes of the present disclosure, which offer substantially greater surface area than commercially-available zinc ribbon anodes, will therefore be more effective grounding or AC mitigation wires than commercially-available zinc ribbon anodes.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A zinc ribbon anode comprising:
   a hollow elongated zinc ribbon having a first end, a second end opposite the first end, an outer surface, and an inner surface defining a hollow space extending from a first opening at the first end to a second opening at the second end;
   such that the hollow space is exposed only at the first opening and the second opening; and
   an elongated metal core disposed within the hollow space and in contact with the inner surface,
   wherein a cross-section of the hollow elongated zinc ribbon taken between the first end and the second end and perpendicular to the outer surface is polygonal in shape, and
   wherein the cross-section has an aspect ratio of at least 1.5:1.

2. The zinc ribbon anode of claim 1, wherein the cross-section has an aspect ratio of at least 2:1.

3. The zinc ribbon anode of claim 1, wherein the cross-section has an aspect ratio of at least 5:1.

4. The zinc ribbon anode of claim 1, wherein the cross-section has an aspect ratio of at least 15:1.

5. The zinc ribbon anode of claim 1, wherein the outer surface has an area of at least about 35 square inches per pound of zinc ribbon anode.

6. The zinc ribbon anode of claim 1, wherein the outer surface has an area of at least about 52 square inches per pound of zinc ribbon anode.

7. The zinc ribbon anode of claim 1, wherein the outer surface has an area of at least about 70 square inches per pound of zinc ribbon anode.

8. The zinc ribbon anode of claim 1, wherein the outer surface has a surface area of at least about 30 square inches per linear foot of zinc ribbon anode.

9. The zinc ribbon anode of claim 1, wherein the outer surface has a surface area of at least about 39 square inches per linear foot of zinc ribbon anode.

10. The zinc ribbon anode of claim 1, wherein the outer surface has a surface area of at least about 60 square inches per linear foot of zinc ribbon anode.

11. The zinc ribbon anode of claim 1, wherein the cross-section is substantially rectangular in shape.

12. The zinc ribbon anode of claim 1, wherein a cross-section of the elongated metal core taken between the first end and the second end is polygonal in shape.

13. The zinc ribbon anode of claim 12, wherein the cross-section of the elongated metal core is rectangular in shape.

14. The zinc ribbon anode of claim 1, wherein the grain structure of the hollow elongated zinc ribbon is substantially longitudinal.

15. The zinc ribbon anode of claim 1, wherein the zinc ribbon anode be longitudinally bent over a smaller radius than a comparative zinc ribbon anode having an aspect ratio of from about 1 to about 2.

16. The zinc ribbon anode of claim 1, wherein the zinc ribbon anode can be longitudinally bent over a radius which is at least 20% smaller than the radius over which a comparative zinc ribbon anode having an aspect ratio of from about 1 to about 2.

17. The zinc ribbon anode of claim 1, wherein the hollow elongated zinc ribbon is formed by extrusion.

\* \* \* \* \*